(12) United States Patent
Zekavica et al.

(10) Patent No.: US 8,814,273 B2
(45) Date of Patent: *Aug. 26, 2014

(54) SEAT STRUCTURES AND PROCESSES TO CREATE SEAT STRUCTURES

(75) Inventors: Ornela Zekavica, Northville, MI (US); Daniel J. Sakkinen, Highland, MI (US); Mark S. Williamson, Highland, MI (US); Antoine Kmeid, Canton, MI (US); Alexander I. Balin, Holland, MI (US); Piotr Roszczenko, Holland, MI (US); Yannis Poulos, Holland, MI (US); Edward J. Lamont, Holland, MI (US)

(73) Assignee: Johnson Controls Technology Company, Holland, MI (US)

(*) Notice: Subject to any disclaimer, the term of this patent is extended or adjusted under 35 U.S.C. 154(b) by 310 days.

This patent is subject to a terminal disclaimer.

(21) Appl. No.: 13/146,615

(22) PCT Filed: Jan. 28, 2010

(86) PCT No.: PCT/US2010/022401
§ 371 (c)(1),
(2), (4) Date: Jul. 27, 2011

(87) PCT Pub. No.: WO2010/088384
PCT Pub. Date: Aug. 5, 2010

(65) Prior Publication Data
US 2011/0278900 A1 Nov. 17, 2011

Related U.S. Application Data

(60) Provisional application No. 61/202,141, filed on Jan. 30, 2009.

(51) Int. Cl.
*A47C 7/02* (2006.01)

(52) U.S. Cl.
USPC .............. 297/452.18; 297/452.2; 297/378.12; 297/378.13; 297/378.1

(58) Field of Classification Search
USPC .............. 297/452.18, 452.2, 378.12, 378.13, 297/378.1
See application file for complete search history.

(56) References Cited

U.S. PATENT DOCUMENTS 5,547,259 A * 8/1996 Fredrick .................. 297/452.18
5,655,816 A * 8/1997 Magnuson et al. ........ 297/452.2
(Continued)

FOREIGN PATENT DOCUMENTS

CN 2709756 Y 7/2005
EP 233822 A2 * 8/1987 .............. B60N 1/06
(Continued)

OTHER PUBLICATIONS

Office Action in KR Appln No. 10-2011-7019642 dated Apr. 26, 2013. (English Translation).

(Continued)

*Primary Examiner* — Laurie Cranmer
(74) *Attorney, Agent, or Firm* — Foley & Lardner LLP

(57) ABSTRACT

A seat structure may be installed in a seat assembly. The seat structure may comprise plurality of tube members forming a substantially closed structure. Some of the tube members have a substantially uniform cross-sectional area along a substantial portion of its respective longitudinal length. At least a first set of the tube members has at least one of a different dimensional property and a different material property from a second set of the tube members such that mechanical properties of each tube member is configured for stress requirements for a respective region that the respective tube member occupies. The plurality of tube members are joined such that the plurality of tube members are in fixed positions relative to each other.

16 Claims, 13 Drawing Sheets

(56) References Cited

U.S. PATENT DOCUMENTS

| | | | |
|---|---|---|---|
| 5,671,976 A * | 9/1997 | Fredrick | 297/452.18 |
| 5,676,423 A * | 10/1997 | Pedronno et al. | 297/378.1 |
| 6,347,836 B1 * | 2/2002 | Hayotte | 297/452.2 |
| 6,752,465 B2 * | 6/2004 | Igarashi | 297/452.18 |
| 7,673,944 B2 * | 3/2010 | Behrens | 297/452.18 |
| 8,061,779 B2 * | 11/2011 | Nakagaki et al. | 297/452.2 |
| 2004/0113481 A1 * | 6/2004 | Saberan et al. | 297/452.18 |
| 2005/0035647 A1 * | 2/2005 | Matsunuma | 297/452.18 |
| 2006/0290180 A1 * | 12/2006 | Belair et al. | 297/232 |
| 2010/0141009 A1 * | 6/2010 | Kirch et al. | 297/452.18 |
| 2010/0171356 A1 * | 7/2010 | Gross et al. | 297/452.18 |

FOREIGN PATENT DOCUMENTS

| | | |
|---|---|---|
| EP | 1 413 475 A2 | 4/2004 |
| FR | 2733945 A1 | 11/1996 |
| FR | 2786743 A1 | 6/2000 |
| JP | 58-062952 | 4/1983 |
| JP | 59-066463 | 5/1984 |
| JP | 2000-166691 A | 6/2000 |
| JP | 2001-017263 A | 1/2001 |
| JP | 2006-212441 A | 8/2006 |
| JP | 2008-296663 A | 12/2008 |
| WO | WO-2008/061233 A2 | 5/2008 |

OTHER PUBLICATIONS

Second Office Action in CN Appln No. 201080009671.4 dated May 13, 2013. (with Translation).
English translation of Japanese office action received in connection with Japanese application No. JP 2011-548293; dtd Feb. 29, 2013.
Japanese office action received in connection with Japanese application No. JP 2011-548293; dtd Feb. 29, 2013.
Chinese Office Action received in connection with Chinese patent application No. CN 201080009671.4; dtd Nov. 20, 2012.
International Search Report and Written Opinion dated Jun. 30, 2010 as received in corresponding application PCT/US2010/022401, 10 pages.
Fourth Office Action dated Mar. 3, 2014 received in corresponding Chinese Application No. 2010800096714 along with English translation.
Japanese Office Action (Final Notice of Rejection) dated Feb. 12, 2014 received in corresponding Japanese Application No. 2011-548293.

* cited by examiner

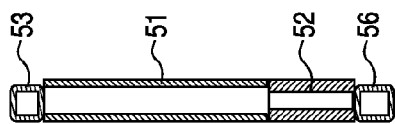
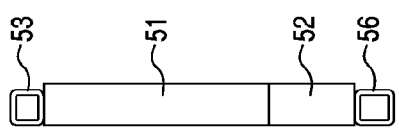
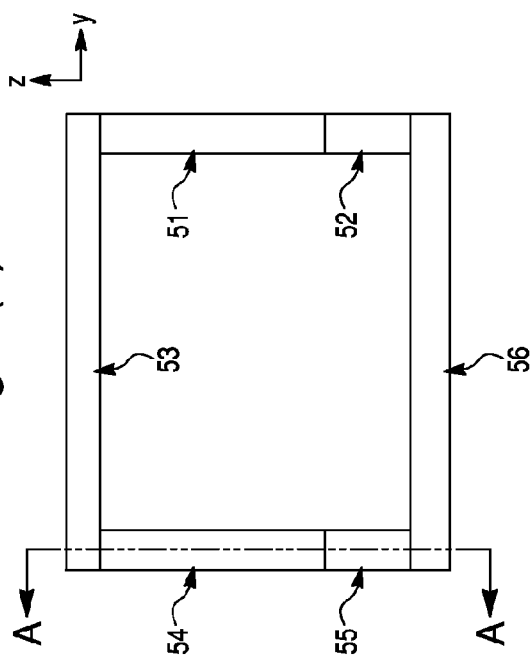
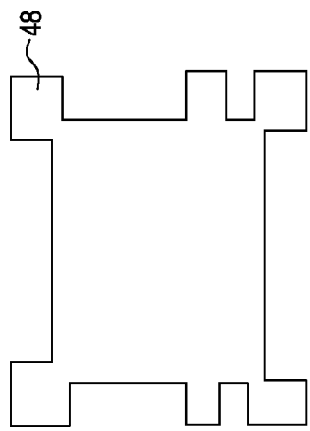
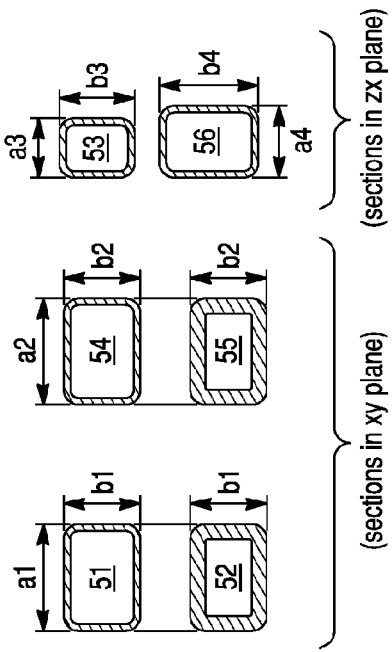

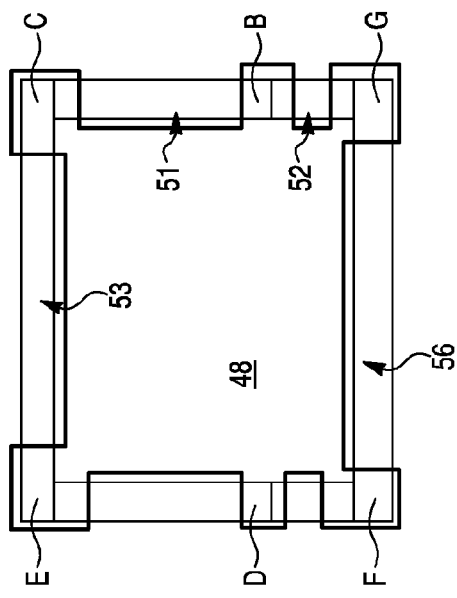
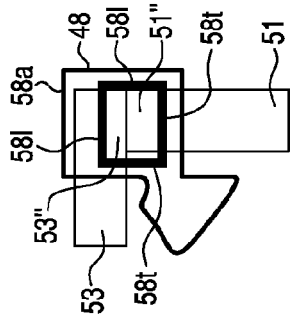
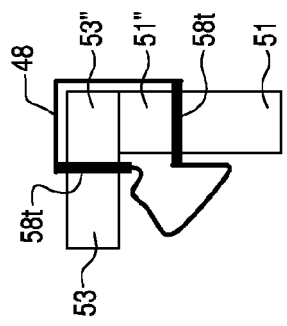
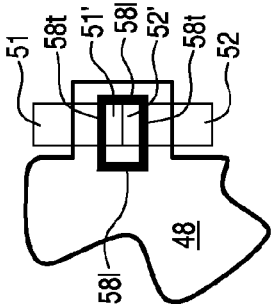
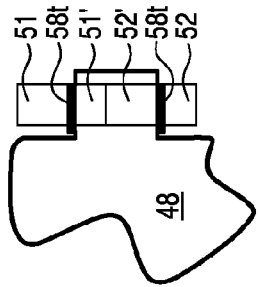

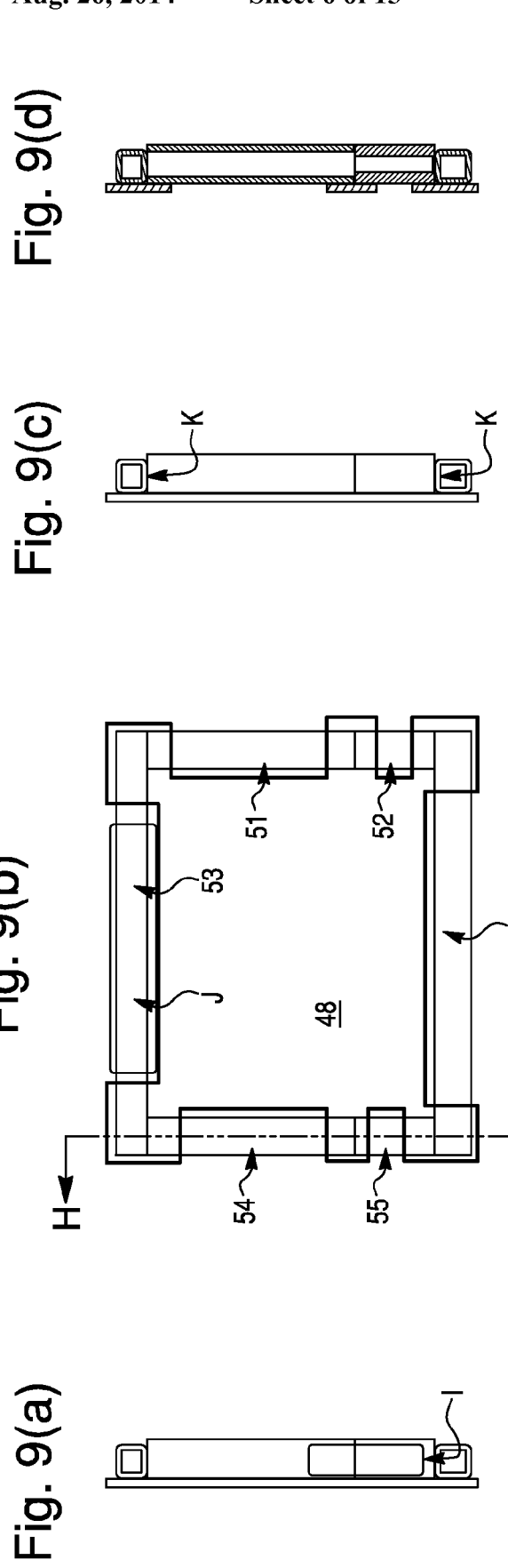

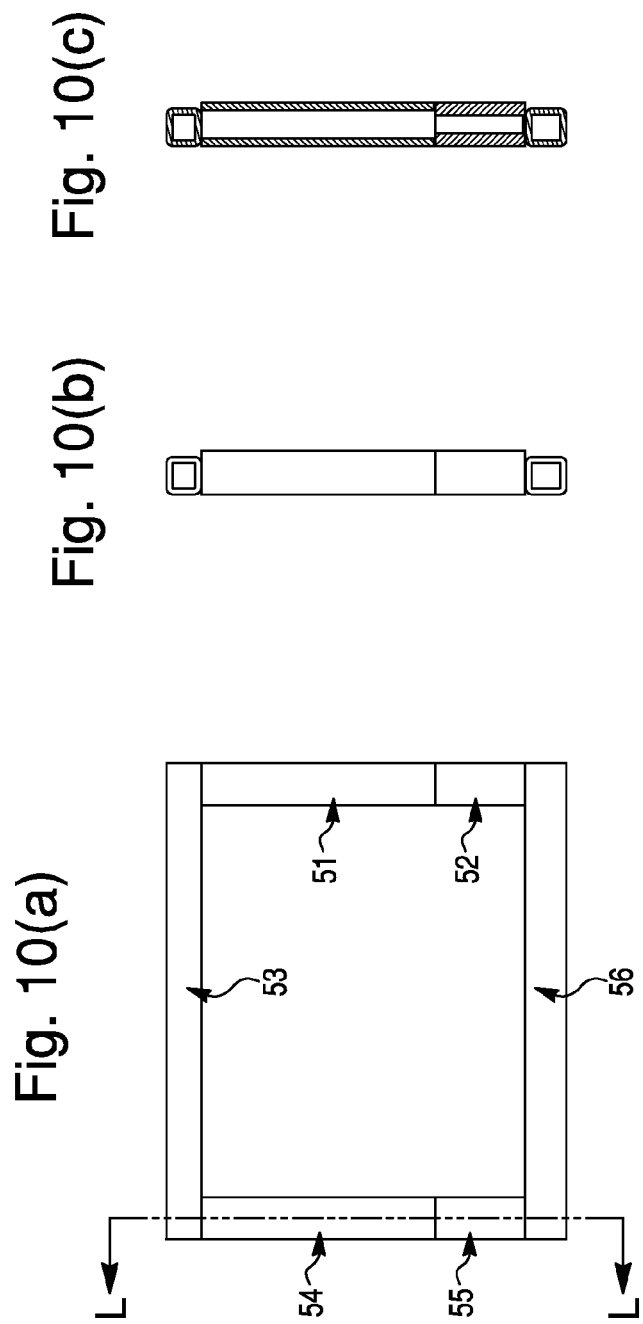

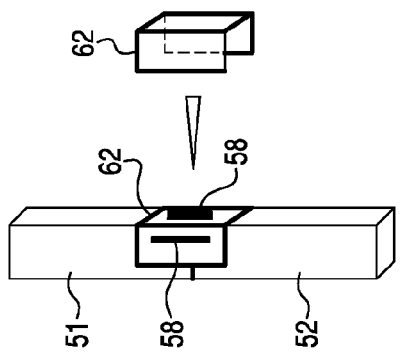
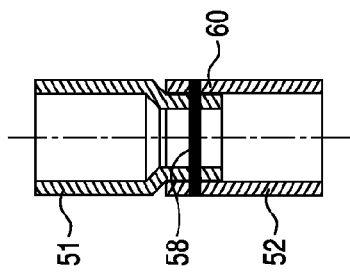
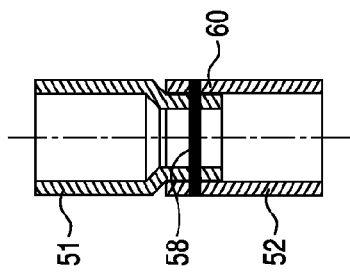
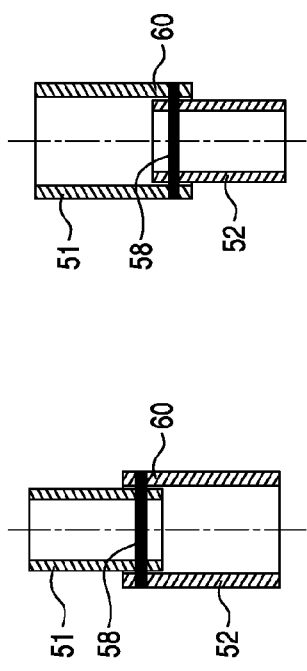
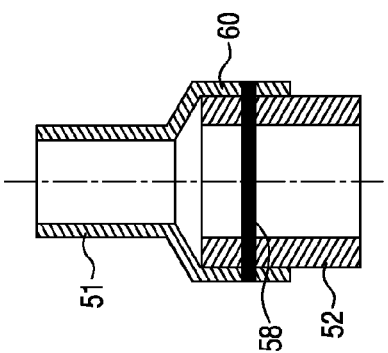
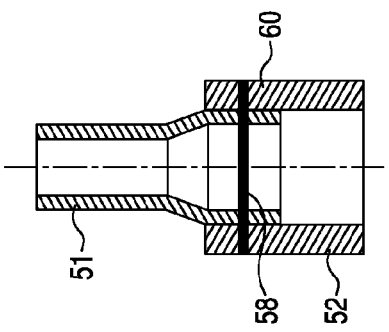
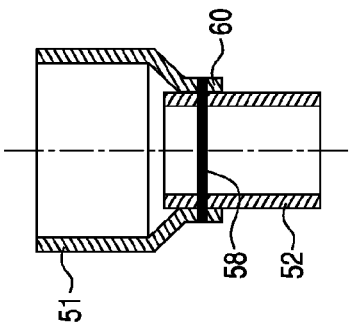

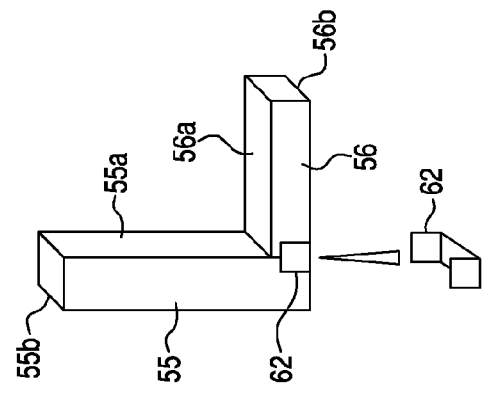
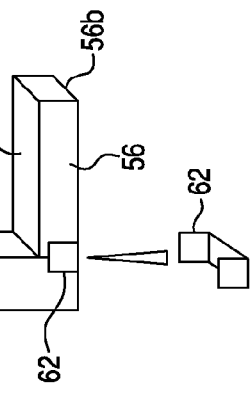
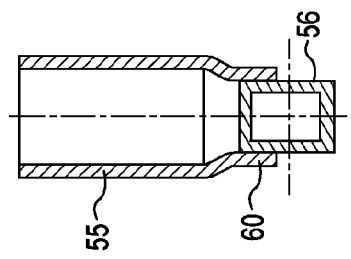
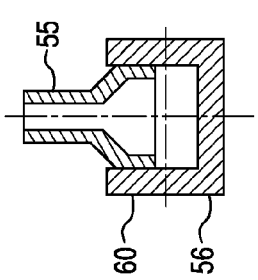
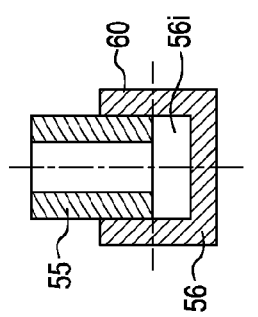
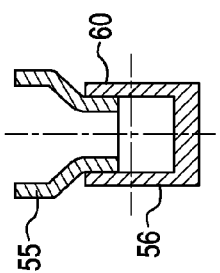
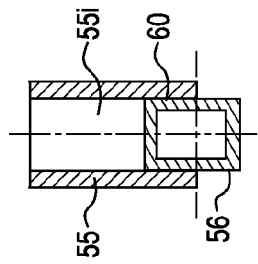

US 8,814,273 B2

SEAT STRUCTURES AND PROCESSES TO CREATE SEAT STRUCTURES

CROSS REFERENCE TO RELATED APPLICATIONS

The present invention claims priority to U.S. Provisional Patent Application No. 61/202,141 titled "Seat Structures and Processes to Create Seat Structures" and filed on Jan. 30, 2009, which is incorporated herein by reference in its entirety.

BACKGROUND

The present disclosure relates to a seat structure for installation in a seat assembly and a method of making a seat structure for installation in a seat assembly.

Seat structures (e.g., seat back frames, seat base cushion frames, low seat structures, back frame seat belt towers, etc.) can provide strength to a seat assembly to meet strength and/or durability requirements that are regulated by governmental agencies (e.g., FMVSS) or dictated by vehicle manufacturers. Seat structures also can be configured to meet the desires of customers for seat assemblies to provide increased functionality or utility (e.g., rotating, folding, sliding) while maximizing user comfort. Achieving the desired structural (e.g., strength, stiffness, durability, etc.), functional, and utility characteristics typically requires the use of additional components, which can have an undesirable impact on mass, cost, and comfort. Seat structures are typically designed by balancing structural and functional characteristics against mass, comfort, and cost.

Conventionally, a seat structure may be constructed by forming a monolithic tube with constant cross sections, with constant thickness and constant outside parameter through a series of tube bending processes and then using a joining process (as gas metal arc welding (GMAW)) to couple support members to the formed tube through a series of manufacturing stations or work cells. The support members, having been formed by conventional stamping processes (e.g., a multiple station progressive stamping die), are typically used to provide attachment structures for other members (e.g., recliner, head rest, retractor, or other structure), or to provide additional strength in high stress areas. This method of construction has several disadvantages. First, the singular tube seat structure accommodates varying stress levels by either over-designing the tube in all regions of the tube so as to withstand the maximum stresses (increasing mass and cost), or by reinforcing the local high stress regions with additional structural components (increasing cost, the number of parts and the number of manufacturing processes). Second, the monolithic tube seat structure may limit design application or compromise design efficiency because of limited manufacturability. For example, the bend radius required for manufacturing a specific tube might drive an inefficient design or even limit the application of the design. Third, a method of constructing the monolithic tube seat structure requires significant part handling downstream in the manufacturing process, which adds to the cost per structure and to the overall tooling (fixture) cost. Fourth, the method of constructing the monolithic tube seat structure can inhibit optimization of mass and strength because the desire to reduce costs by having as few parts as possible in the assembly can cause manufacturers to structurally overdesign portions of the seat structure to achieve part reduction. Finally, some conventional methods of coupling (e.g., GMAW, fasteners) require overlaps and/or the addition of material, such as extra parts or filler material, which negatively impacts mass and cost.

A conventional seat back structure constructed using a round tube 8 is shown in FIG. 14. This construction illustrates the need to include members 10 to provide attachment of recliners and members 12 to provide attachment for headrests or other members. This conventional construction is inefficient with respect to mass and cost. The mass is increased since the attachment members may provide no additional strength beyond solely the attachment function. The cost is increased because the redundant attachment members increase cost per structure and the need to couple them to the structure increases manufacturing costs through handling and assembly.

There is a need to design and form structural components with reduced mass and reduced cost, while meeting or exceeding strength and durability requirements. Additionally, the cost to handle the component increases significantly as a product moves downstream in its manufacturing cycle, hence there is a desire to reduce or eliminate downstream operations.

SUMMARY

According to one embodiment of the present invention, a seat structure for installation in a seat assembly may comprise a plurality of tube members forming a substantially closed structure. Some of the tube members have a substantially uniform cross-sectional area along a substantial portion of its respective longitudinal length. At least a first set of the tube members has at least one of a different dimensional property and a different material property from a second set of the tube members such that mechanical properties of each tube member is configured for stress requirements for a respective region that the respective tube member occupies. The plurality of tube members are joined such that the plurality of tube members are in fixed positions relative to each other According to another embodiment of the present invention, a method of making a seat structure for installation in a seat assembly may comprise placing a plurality of tube members on a joining fixture, wherein at least a first set of the tube members has at least one of a different dimensional property and a different material property from a second set of the tube members such that mechanical properties of each tube member is configured for stress requirements for a respective region that the respective tube member occupies, and coupling the plurality of tube members on the joining fixture such that a substantially closed structure is formed.

It is to be understood that both the foregoing general description and the following detailed description are exemplary and explanatory only, and are not restrictive of the invention as claimed.

BRIEF DESCRIPTION OF THE DRAWINGS

The features, aspects and advantages of the present invention will become apparent from the following description, appended claims, and the accompanying exemplary embodiments shown in the drawings, which are briefly described below.

FIGS. 5(a)-5(d) are views showing a plurality of tube members for the seat structure for use within a seat assembly according to an embodiment of the present invention. FIG. 5(a) is a front view of the tube members. FIG. 5(b) is a right side view of the tube members of FIG. 5(a). FIG. 5(c) is the cross-section of the tube members taken along section line A-A of FIG. 5(a). FIG. 5(d) are the transverse cross-sectional views of the tube members of FIG. 5(a).

FIG. 6 is a front view of the panel member for the seating structure according to an embodiment of the present invention.

FIGS. 8(a)-8(e) are schematic views showing the process of coupling the tube members to the panel member according to embodiments of the present invention. FIG. 8(a) shows a front view of the closed section seat structure being coupled in a single process. FIG. 8(b) is a detail view illustrating the side coupling of in-line tube members according to one embodiment of the present invention. FIG. 8(c) is a detail view illustrating the side coupling of in-line tube members according to another embodiment of the present invention. FIG. 8(d) is a detail view illustrating the corner coupling of tube members forming a corner section according to one embodiment of the present invention. FIG. 8(e) is a detail view illustrating the corner coupling of tube members forming a corner section according to another embodiment of the present invention.

FIGS. 9(a)-9(d) are views showing an assembled seat structure coupled in a single process using the components shown in FIGS. 5(a)-5(d) and 6. FIGS. 9(a), 9(b), and 9(c) are the left side view, the front view, and the right side view, respectively, of the assembled seat structure. FIG. 9(d) shows the cross-section of the assembled seat structure taken along section line H-H of FIG. 9(b).

FIGS. 10(a)-10(c) are views showing a seat structure according to another embodiment of the present invention. FIGS. 10(a) and 10(b) are the front view and the right side view, respectively, of the assembled seat structure. FIG. 10(c) shows the cross-section of the assembled seat structure taken along section line L-L of FIG. 10(a).

FIGS. 12(a)-12(l) are schematic views showing interfaces of two substantially in-line tube members in a condition that enables joining to each other according to embodiments of the present invention.

FIGS. 13(a)-13(g) are schematic views showing interfaces of two tube members that form a corner section in a condition that enables joining to each other according to embodiments of the present invention.

DETAILED DESCRIPTION

Referring generally to the FIGURES, disclosed are structures for use within a seat assembly of a motor vehicle and processes for forming seat structures. The structures are also suitable in seat assemblies outside of motor vehicles, such as theater seats, lounge seats, and any other suitable type of seat assembly. Based on the present disclosure, a seat structure can be configured to achieve, for example, desired strength, durability, functionality, utility, mass, cost, and/or user comfort characteristics.

A seat structure constructed in accordance with the present disclosure can offer the ability to, for example, eliminate redundant components, reduce handling and processing, reduce cost, and optimize mass and strength. For example, redundant attachment components can be eliminated by constructing the seat structure with improved geometry and methods, which reduces mass and cost. The eliminated components reduce the handling and processing of the seat structure, which further reduce cost. The improved geometry also can be strength optimized, which further reduces mass.

Figure 1:
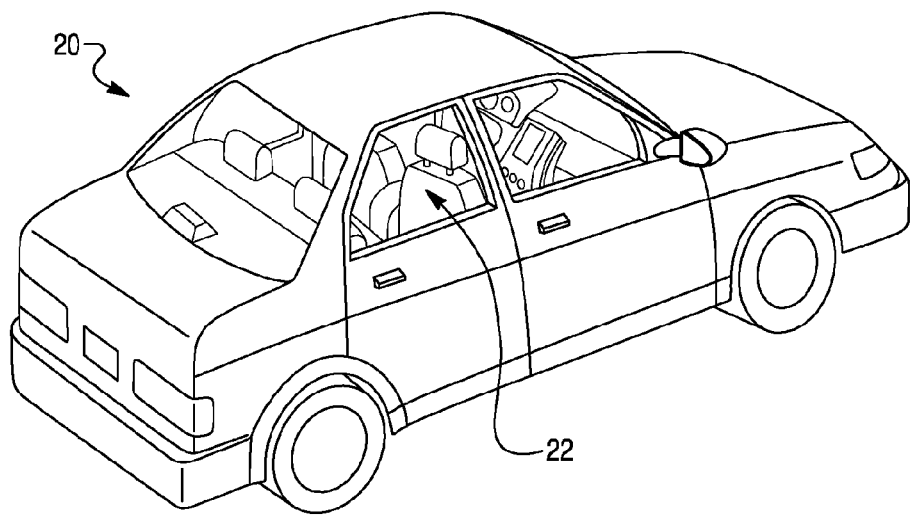
FIG. 1 is a perspective view of a motor vehicle according to an embodiment of the present invention.
Figure 2:
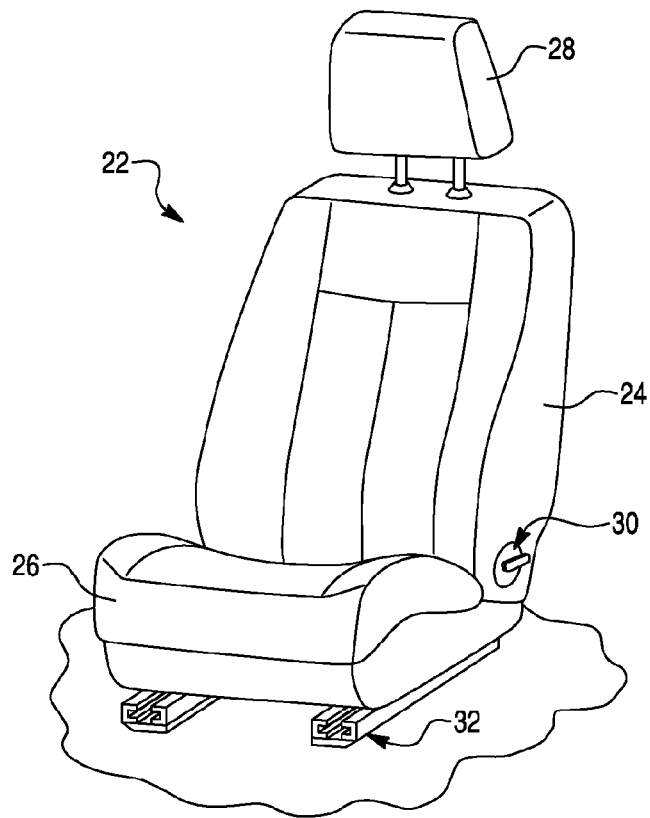
FIG. 2 is a perspective view of a seat assembly for use within a motor vehicle, such as the motor vehicle of FIG. 1.

FIG. 1 shows a vehicle 20 according to one embodiment of the present invention. The vehicle 20 can include one or more seat assemblies 22 provided for occupant(s) of the vehicle. FIG. 2 shows an embodiment of a seat assembly 22 used in a motor vehicle, such as the motor vehicle 20 of FIG. 1. While the vehicle 20 of FIG. 1 is a four door sedan, it should be understood that the seat assembly may be used in mini-vans, sport utility vehicles, trucks, buses, airplanes, trains, boats, or any type of other vehicle, as well as in applications outside of vehicles.

As shown in FIG. 2, the seat assembly 22 can include a seat back 24 and a seat cushion (or base) 26 to provide comfort to the occupant and strength during a dynamic impact event; a head rest 28 to help prevent the occupant from getting whiplash during a dynamic impact event; a recliner mechanism 30 to provide rotatable adjustability of the seat back 24 with respect to the seat cushion 26; and a track assembly 32 to provide translational adjustability of the seat assembly 22 in the front-and-rear directions of the motor vehicle 20 for comfort or utility.

Figure 3:
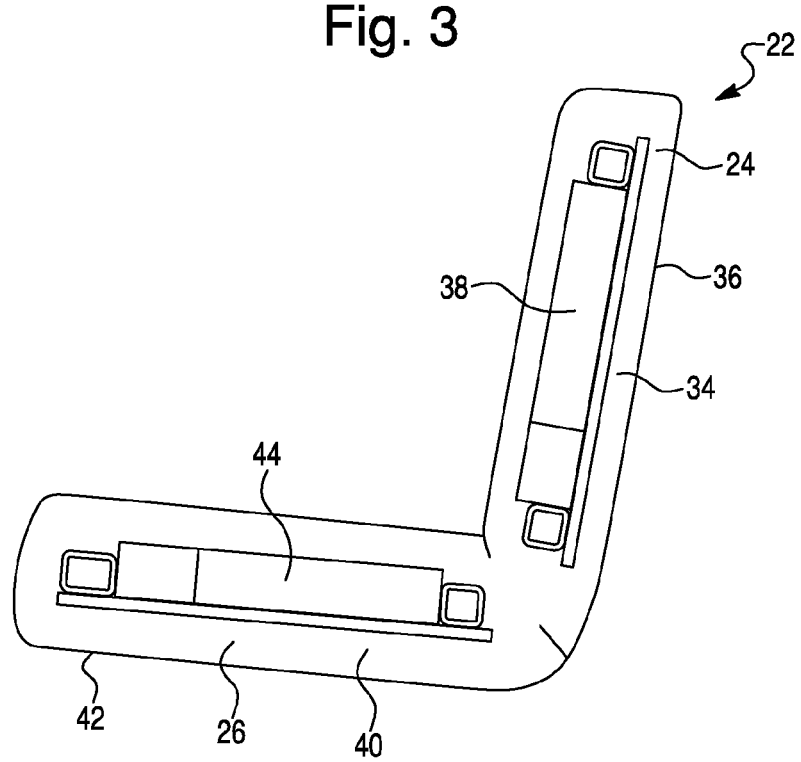
FIG. 3 is a schematic cross-sectional view of the body of the seat assembly of FIG. 2.

FIG. 3 is a schematic cross-sectional view of the body of the seat assembly 22 of FIG. 2 having a seat back structure 38 and a seat cushion structure 44. The seat back 24 can include, for example, a foam pad 34, a trim cover 36, and a seat back structure 38. The seat cushion 26 can include, for example, a foam pad 40, a trim cover 42, and a seat cushion structure 44. The seat assembly 22 in FIGS. 2 and 3 is a one-occupant seat typically used in the front row of a vehicle, but the seat structures may be incorporated into any seat assembly (e.g., a second row bench, a third row fold flat) for use within any vehicle.

FIGS. 5(a)-5(d) and 6 shows components of a seat structure according to one embodiment of the present invention, which may be, for example, the seat back structure 38 and/or the seat cushion structure 44. The seat structure includes a panel member (or back panel) 48 and a plurality of tube members 51, 52, 53, 54, 55, and 56. FIG. 5(a) shows the front view of the tube members. FIG. 5(b) shows a right side view of the tube members of FIG. 5(a). FIG. 5(c) shows the cross-section of the tube members taken along section line A-A of FIG. 5(a). FIG. 5(d) shows the transverse cross-section of the tube members of FIG. 5(a). FIG. 6 shows the panel member for the seating structure according to an embodiment of the present invention.

The plurality of tube members may form a substantially closed structure. A "substantially closed structure" may encompass a structure that has a closed periphery around at least 75% of its circumference, or preferably around about 90% to 100% of its circumference, or more preferably around about 98% or 99% to 100% of its circumference. The plurality of tube members may comprise six rectangular tube members 51, 52, 53, 54, 55, and 56 of varying properties (e.g., length, thickness, material or mechanical properties) but any suitable number of tube members may be used, such as two, three, four, five, seven, or more. One or more or all of the tube members may have a substantially rectangular cross-sectional area with a rectangular external surface in the transverse direction and may be made from materials comprising, for example, magnesium, aluminum, steel, or any combination thereof, but any suitable material may be used.

The tube members may have generally rectangular cross-sections, as shown, but the tube members are not limited to the ones shown in FIGS. 5(a)-5(d). For example, the tube members can vary, among other parameters, by their absolute axial length, their axial length relative to each other, their outside shape or periphery (e.g. circular, oval, rectangular, square, etc.), the dimensions of their outside shape or periphery, their thickness, and their material properties. Each tube member may have a substantially uniform cross-sectional area along a substantial portion of its respective longitudinal length. A "substantial portion of its longitudinal length" may comprise over 50% of its entire length, or along about 75% to 100% of its entire length, or along about 90% to 100% of its entire length.

As seen in FIGS. 5(a)-5(d), the tube members 51 and 52 may have the same exterior width a1 and the same exterior height b1, but they may have different lengths, different thicknesses, and different material properties or compositions. The tube members 54 and 55 may have the same exterior width a2 and the same exterior height b2, but they may have different lengths, different thicknesses, and different material properties or compositions. The tube member 53 may have a different exterior width a3, a different exterior height b3, a different length, a different thickness, and different material properties or compositions from the tube member 56 having an exterior width a4 and an exterior height b4. Of course, the individual tube members may have any suitable properties that may be the same or different from any other tube member. Thus, the seat structure according to other embodiments may include any number of tube members, having varying at least one of a dimensional property and a material property or composition such that the mechanical properties of each tube member is configured for (or is tailored to) specific stress requirements for a respective region that the respective tube member occupies in the seat assembly. The at least one of the different dimensional property and the different material property may include at least one of an exterior width, an exterior height, a transverse cross-sectional area, a material thickness, and a material composition, or any combination of these properties. The tube members are operatively coupled to provide the required structural and functional requirements in a reduced mass and cost configuration. The plurality of tube members may be joined such that the plurality of tube members are in fixed positions relative to each other using the panel member.

The panel member (or back panel) 48 may be made of steel, aluminum, magnesium, or any combination thereof, but any other appropriate material may be used. The panel member 48 may be a piece of sheet metal that is cut or manufactured through a conventional trimming process. The panel member 48 may take any suitable shape that would allows its coupling to the tube members. For example, besides the shape shown in FIG. 6, the panel member may have simply a rectangular shape and/or have an aperture located within the perimeter formed by the tube members and/or have more or less notched sections from those depicted in FIG. 6. The panel member may be of any suitable thickness, such as less than 1/16 inch, between 1/16 and 1/8 inch, between 1/8 and 1/4 inch, or greater than 1/4 inch. The amount of material for the seat structure with the panel member and the tube members may be less than the amount of material used for a seat structure with merely circular tube members.

Seat structures using the plurality of tube members 51-56 and the panel member 48 may have reduced mass compared to conventional seat structures. The tube members, for example, having mechanical properties tailored to the specific stress requirements of the region that portion of the tube member occupies, eliminates the conventional seat structure solution to the problem of varying stress levels for different regions of the structure by either (1) overdesigning a tube to meet the highest stress requirement or (2) designing a tube to meet a lower stress requirement but adding supporting structural members in the higher stress areas. An example of the second conventional solution may be adding reinforcement plates or clamps to the seat structure at locations that undergo high stress when in use in the seat assembly. Additionally, the rectangular tube members, having substantially rectangular cross-sectional areas with rectangular external perimeters or surfaces, have an improved bending moment of inertia relative to mass, when compared to conventional round tubes. This strength-to-mass efficiency is further improved by not requiring the mounting brackets needed in conventional seat structures. In contrast, conventional seat structures, having round tubes, which cannot provide an adequate mounting surface, require mounting brackets to provide a flat structural surface for coupling another member (e.g., a recliner mechanism, a headrest sleeve, a track mechanism) to the structure.

Figure 7:
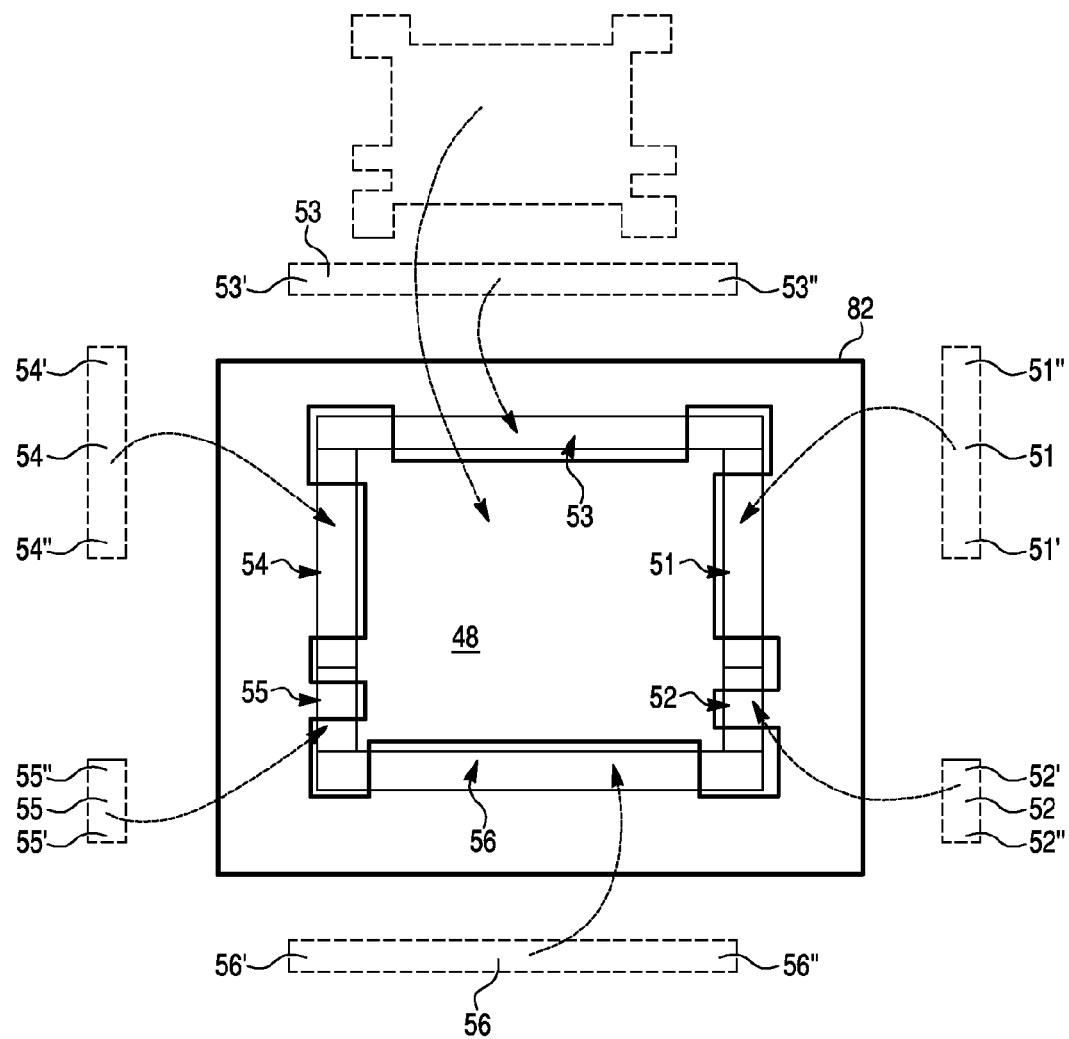
FIG. 7 is a schematic view showing the placement of the tube members of FIGS. 5(a) and 5(d) and the panel member of FIG. 6 on a weld or joining fixture.

The seat structure may be made by placing the panel member 48 and the tube members 51-56 onto a weld or joining fixture 82 of a work station 80 (as seen FIG. 4) using any attachment mechanisms on the weld or joining fixture (such as brackets or claims) that may be necessary. Then, the six tube members 51-56 are coupled to the panel member 48, preferably through a laser welding process, as described below. Additionally, the tube members 51-56 may be coupled to each other if required to improve strength or for other purposes. FIG. 7 shows the placement of the tube members and the panel member 48 on the welding fixture 82 before welding. The tube members 51-56 may be placed on top of the panel member 48 or the panel member may be placed on the tube members. FIG. 7 shows that the seat structure may be constructed by having the first end 51' of the tube member 51 proximate to the first end 52' of the tube member 52 and the second end 51" of the tube member 51 proximate to the second end 53" of the tube member 53; having the second end 52" of the tube member 52 proximate to the second end 56" of the tube member 56; having the first end 53' of the tube member 53 proximate to the first end 54' of the tube member 54; having the second end 54" of the tube member 54 proximate to the second end 55" of the tube member 55; and having the first end 55' of the tube member 55 proximate to the first end 56' of the tube member 56.

Figure 4:
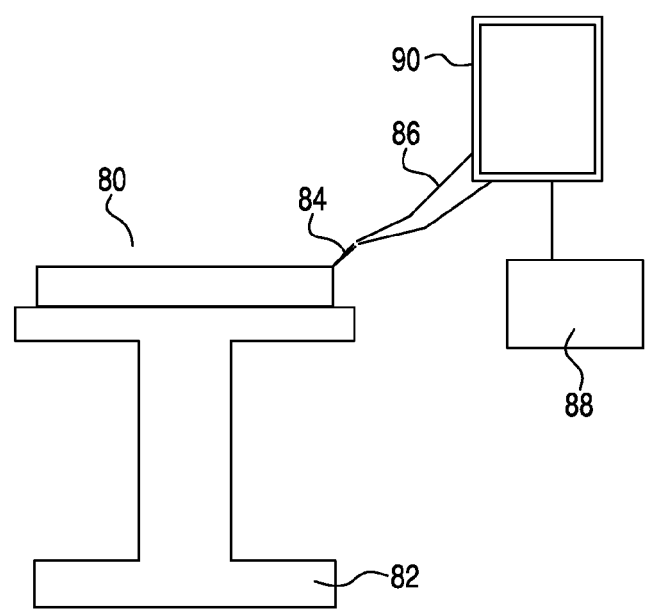
FIG. 4 is a schematic view of a work station for assembly of the seat structure according to an embodiment of the present invention.

After placing the tube members 51-56 onto the panel member 48 or vice versa, the tube members 51-56 may be coupled to the panel member 48 by welding, for example by laser welding. As seen in FIG. 4, a robotic arm 86 may be used to deliver the laser beam 84 to the tube members on the weld or joining fixture 82 such that the panel member is joined to each of the plurality of tube members via welding. The welding apparatus 90 with its robotic arm 86 may be controlled using a control unit 88. FIGS. 8(a)-8(d) show examples of the methods for coupling the tube members to the panel member used to construct the seat structure. FIG. 8(a) shows the welding locations C, B, D, E, F, and G. FIGS. 8(b) and 8(c) illustrate two methods of coupling two tube members, which are substantially in line longitudinally, such as at locations B and D shown in FIG. 8(a). FIGS. 8(d) and 8(e) illustrate two methods for coupling two tube members that form a corner section, such as at locations C, E, F, and G shown in FIG. 8(a).

FIGS. 8(b) and 8(c) shows the tube member 51 and the tube member 52 being substantially in line, longitudinally, whereby the first end 51' of the tube member 51 may be contacting the first end 52' of the tube member 52. The first method of coupling in-line tube members, as shown in FIG. 8(*b*) involves coupling the tube member 51 to the panel member 48, preferably by laser welding, through a section that runs transverse and perpendicular to the longitudinal axis of the tube member 51, and coupling the tube member 52 to the panel member 48, preferably by laser welding (but other types of welding or joining techniques in general can be used), through a section that runs transverse and perpendicular to the longitudinal axis of the tube member 52. The two resulting welds 58*t* are substantially parallel to each other having a spacing that may vary depending on the design of the seat structure. The two transverse welds 58*t* welds may be along the edges of the panel member 48, as seen in FIG. 8(*b*), or within the edges of the panel member (that is, closer together like the transverse welds 58*t* of FIG. 8(*c*)).

The second method of coupling in-line tube members, as shown in FIG. 8(*c*), involves coupling the tube member 51 to the panel member 48, preferably by laser welding, through a section that runs transverse and perpendicular to the longitudinal axis of the tube member 51, and coupling the tube member 52 to the panel member 48, preferably by laser welding, through a section that runs transverse and perpendicular to the longitudinal axis of the tube member 52. The two transverse welds 58*t* are substantially parallel to each other having a spacing that may vary depending on the design of the seat structure. Both ends of the transverse weld 58*t* through the tube member 51, are connected with both ends of the transverse weld 58*t* through the tube member 52 using longitudinal welds 58*l*, forming one substantially rectangular weld. The spacing of the transverse welds 58*t* and the longitudinal welds 58*l* of FIG. 8(*c*) may be closer or farther apart. For example, the transverse welds 58*t* of FIG. 8(*c*) may be along the edges of the panel member 48 (that is, farther apart like the transverse welds 58*t* of FIG. 8(*b*)).

FIGS. 8(*d*) and 8(*e*) show the tube member 51 and the tube member 53 forming a corner section, whereby the second end 51" of the tube member 51 may be contacting the second end 53" of the tube member 53". The first method of coupling tube members forming a corner section, as shown in FIG. 8(*d*), is constructed by coupling the tube member 51 to the panel member 48, preferably by laser welding, through a section that runs transverse and perpendicular to the longitudinal axis of the tube member 51, and by coupling the tube member 53 to the panel member 48, preferably by laser welding, through a section that runs transverse and perpendicular to the longitudinal axis of the tube member 53. The two welds 58*t* are substantially perpendicular to each other having a spacing that may vary depending on the design of the seat structure. The two welds 58*t* may be along the edges of the panel member 48, as seen in FIG. 8(*d*), or within the edges of the panel member (that is, closer together like the two transverse welds 58*t* of FIG. 8(*e*)).

The second corner method of coupling tube members forming a corner section, as shown in FIG. 8(*e*) is constructed by coupling the tube member 51 to the panel member 48, preferably by laser welding, through a section that runs transverse and perpendicular to the longitudinal axis of the tube member 51, and by coupling the tube member 53 to the panel member 48, preferably by laser welding, through a section that runs transverse and perpendicular to the longitudinal axis of the tube member 53. The two welds 58*t* are substantially perpendicular to each other having a spacing that may vary depending on the design of the seat structure. Two additional welds 58*l* are made, preferably by laser welding, such that a substantially rectangular weld shape with two sides running substantially parallel to and two sides running substantially perpendicular to the longitudinal axis of the tube member 51. This substantially rectangular weld is illustrated having the upper weld 58*l* positioned through the tube member 53 in a direction substantially parallel to the longitudinal axis of the tube member 53. Of course, the welds 58*t* and 58*l* may be placed in other locations. For example, the upper weld 58*l* of FIG. 8(*e*) may be positioned at position 58*a*.

According to other embodiments of the present invention, the coupling of side tube members (i.e., those tube members that are positioned substantially in line to each other) and the coupling of corner tube members (i.e., those tube members that are positioned substantially perpendicular to each other) may be done with geometry other than that disclosed in FIGS. 8(*b*) through 8(*e*). For example, the coupling, through laser welding, of a tube member to a panel member may be made using a fillet welded joint between the tube member and the panel member, or by using welds having different geometry to that shown (e.g., a circular weld). Additionally, the coupling of a tube member to another tube member may be made using other known welding joints (e.g., butt-welds at the ends of the tube members). The coupling may be done by a laser welding process, as this process offers quicker processing with improved repeatability and reliability, but the coupling is not limited to this process. The improved manufacturing process allows for the seat structure to be coupled in one assembly station or work cell, utilizing one fixture, in contrast to conventional seat structures coupled together using methods such as GMAW which require a series of assembly stations, thus resulting in slower processing and increased cost from the additional tooling or fixtures and from additional product handling.

According to other embodiments of the present invention, the work station 80 may be used to join the tube members 51-56 to the panel member 48 in a variety of joining methods other than or in addition to laser welding. For example, the tube members 51-56 and panel member 48 may be joined by brazing, mechanical joining (clamps, etc.), gluing, other types of welding (such as GMAW), or any combination thereof.

FIGS. 9(*a*)-9(*e*) shows a seat structure formed using the methods disclosed herein. FIGS. 9(*a*), 9(*b*), and 9(*c*) are the left side view, the front view, and the left side view, respectively, of the assembled seat structure. FIG. 9(*d*) shows the cross-section of the assembled seat structure taken along section line H-H of FIG. 9(*b*). The area I of FIG. 9(*a*) illustrates the advantage of having flat contact surfaces which can be used to attach, for example, a latch or recliner attachment, without the need for additional attachment brackets. The area J of FIG. 9(*b*) illustrates the advantage of having flat contact surfaces which can be used to attached, for example, a head rest attachment and/or a center belt exit attachment, without the need for additional attachment brackets. The areas K of FIG. 9(*c*) illustrates the advantage of having flat surfaces for the beam connections or connections for other structural components, which is easier than circular frames, because no additional brackets are necessary. In other words, the use of substantially rectangular cross-section tube members provides for flat contact surfaces which are in the correct planes to provide attachment for other members without secondary brackets. This efficient construction reduces mass and cost, when compared to conventional seat structures constructed using round tubes.

According to another embodiment of the present invention, a seat structure may comprise a plurality of tube members 51-56, similar to those shown in FIGS. 5(*a*)-5(*d*), but that are assembled without the use of the panel member 48. This embodiment is shown in FIGS. 10(*a*)-10(*c*) in which FIGS.

10(a) and 10(b) are the front view and right side view, respectively, of the seat structure and FIG. 10(c) shows the cross-section of the seat structure taken along section line L-L of FIG. 10(a). The seat structure of FIGS. 10(a)-10(c) may comprise six substantially rectangular tube members of varying properties (e.g., length, thickness, material or mechanical properties, as described in connection with the prior embodiment) made preferably from steel. However, other embodiments of seat structures may be formed using any number of tube members made from any appropriate material (e.g., magnesium, aluminum).

As with the tube members of FIG. 5(a)-5(d), the tube members 51 and 52 may have the same exterior width a1 and the same exterior height b1, but they can have different lengths, thicknesses, and material properties or compositions. The tube members 54 and 55 may have the same exterior width a1 and the same exterior height b1, but they can have different lengths, thicknesses, and material properties or compositions. The tube member 53 may have a different exterior width a3, a different exterior height b3, a different length, a different thickness, and different material properties or compositions from the tube member 56 having an exterior width a4 and an exterior height b4. Of course, the individual tube members may have any suitable properties that may be the same or different from any other tube member. Thus, the seat structure may include any number of tube members, having varying at least one of a dimensional property and a material property such that mechanical properties of each tube member is configured for (or is tailored to) specific stress requirements for a respective region that the respective tube member occupies in the seat assembly. The at least one of the different dimensional property and the different material property may include at least one of an exterior width, an exterior height, a transverse cross-sectional area, a material thickness, and a material composition, or may be any combination of these properties. The tube members are operatively coupled to provide the required structural and functional requirements in a reduced mass and cost configuration.

As with the case for the prior embodiment, the seat structure of FIGS. 10(a)-10(c) may have reduced mass compared to conventional seat structures. The tube members of this embodiment, having mechanical properties tailored to the specific stress requirements of the region that portion of the tube member occupies, eliminates the conventional seat structure solution to the problem of varying stress levels for different regions of the structure, by either (1) overdesigning the tube to meet the highest stress requirement or (2) designing the tube to meet a lower stress requirement and adding supporting structural members in the higher stress areas. Additionally, the rectangular tubes, having substantially rectangular cross-sectional areas with substantially rectangular external perimeters or surfaces, have an improved bending moment of inertia relative to mass, when compared to conventional round tubes. This strength-to-mass efficiency is further improved by not requiring the mounting brackets included in conventional seat structures. Conventional seat structures, having round tubes which cannot provide an adequate mounting surface, require mounting brackets to provide a flat structural surface for coupling another member (e.g., a recliner mechanism, a headrest sleeve, a track mechanism) to the structure.

Figure 11:
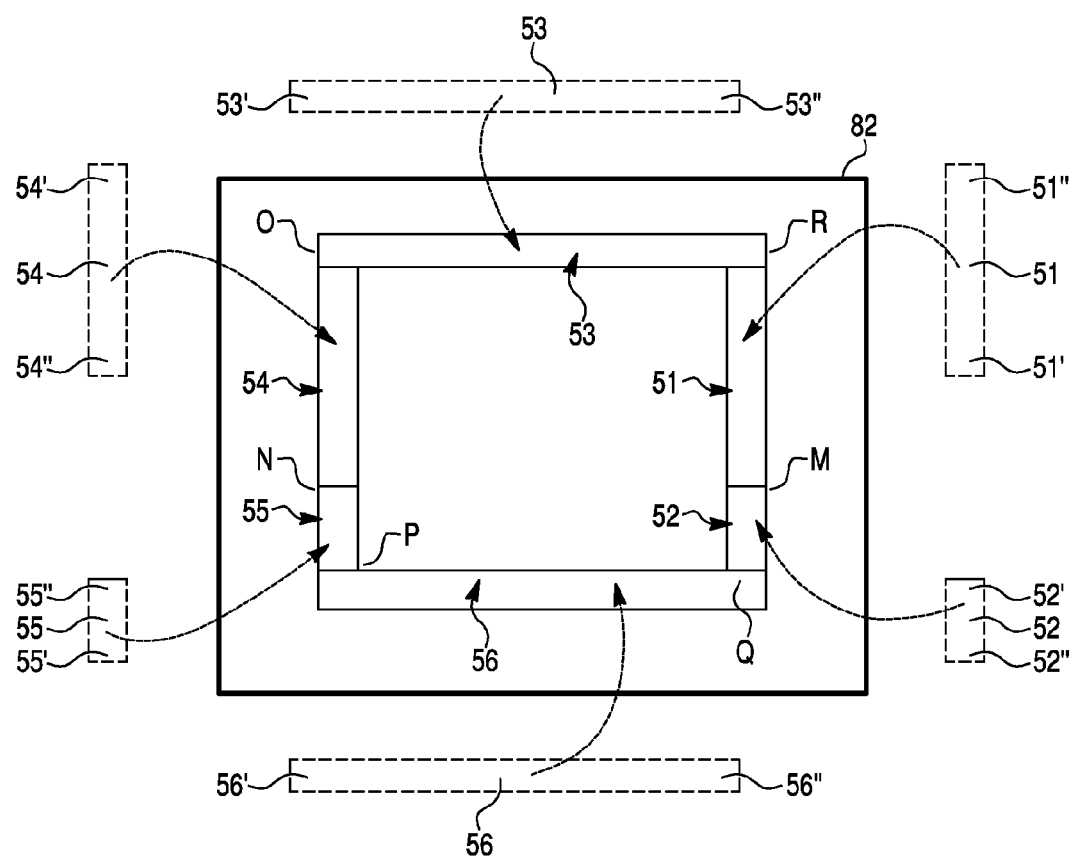
FIG. 11 is a schematic view showing the placement of the tube members of FIG. 10(a) on the weld or joining fixture.

FIG. 11 shows the placement of the six tube members 51-56 onto a weld or joining fixture 80, such as the one seen in FIG. 4. After placement, the tube members are then coupled to each other, preferably through a laser welding process, as described below. The seat structure of FIGS. 10(a)-10(c) may be constructed by having the first end 51' of the tube member 51 proximate to the first end 52' of the tube member 52 and the second end 51" of the tube member 51 proximate to the second end 53" of the tube member 53; having the second end 52" of the tube 52 proximate to the second end 56" of the tube member 56; having the first end 53' of the tube member 53 proximate to the first end 54' of the tube member 54; having the second end 54" of the tube member 54 proximate to the second end 55" of the tube member 55; and having the first end 55' of the tube member 55 proximate to the first end 56' of the tube member 56.

Figure 12H:
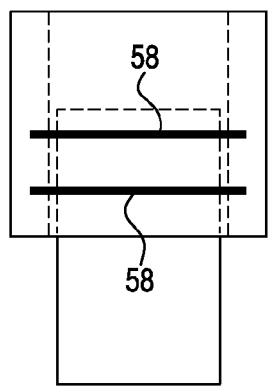
Figure 12I:
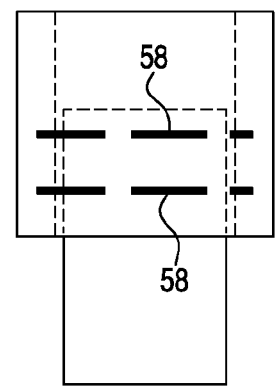
Figure 12J:
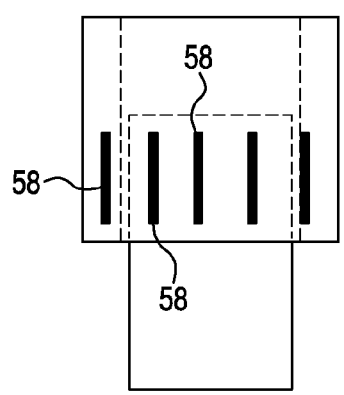
Figure 12K:
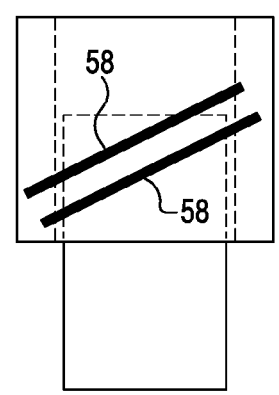
Figure 12I:
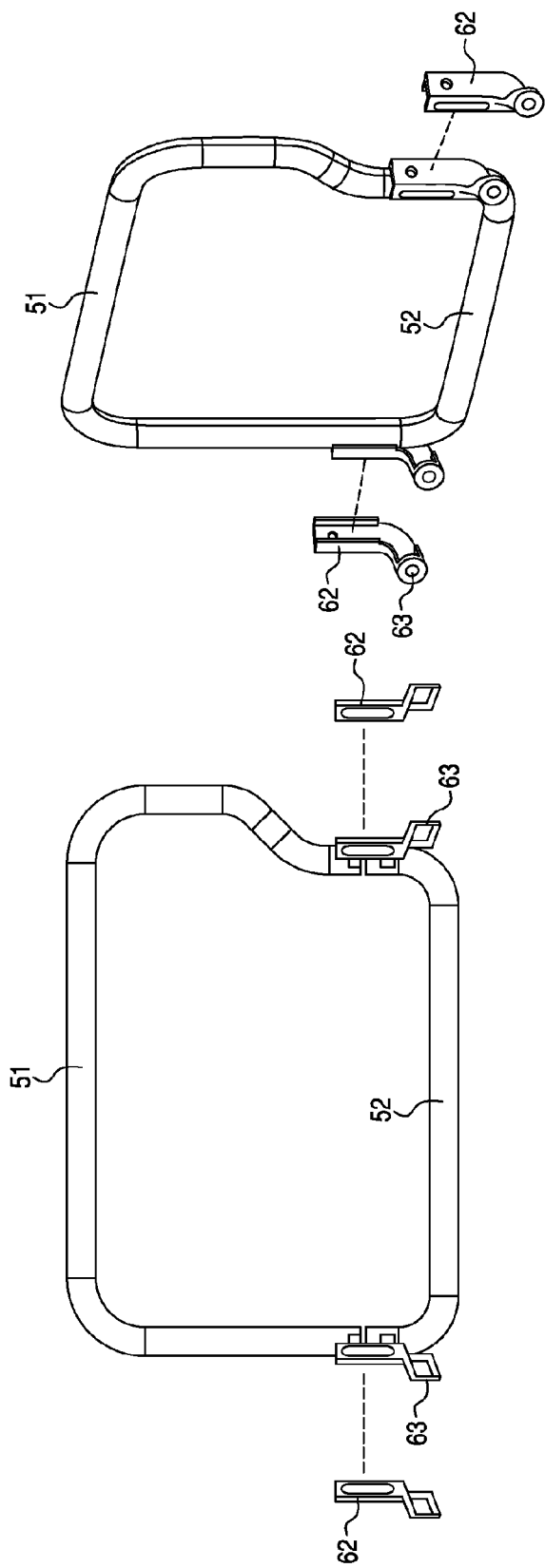
Figure 14:
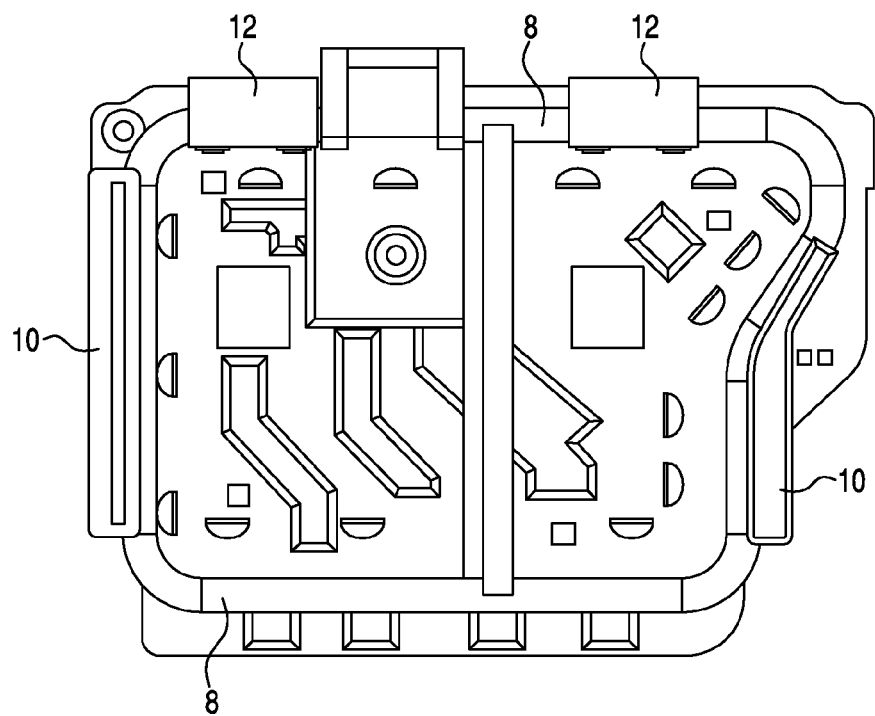
FIG. 14 is a front view of a conventional seat structure that is coupled over a series of processes.

The tube members 51-56 are then coupled to each other so as to construct the seat structure of FIG. 10 such that the plurality of tube members are in fixed positions relative to each other. FIGS. 12(a)-12(l) illustrate different methods of coupling two in-line tube members, which are substantially in line, longitudinally. Such coupling of in-line tube members takes place at locations M and N shown in FIG. 11. For the sake of illustration, FIGS. 12(a)-12(g) shows the coupling methods with regard to the first end 51' of the tube member 51 and the first end 52' of the tube member 52 at the coupling location M, whereby the first end 51' of the tube member 51 may be contacting the first end 52' of the tube member 52, but these methods are just as applicable at the coupling location N. FIG. 12(a) shows the tube member 52 having a substantially uniform cross-sectional area with an inner shape (e.g., square, rectangular, round, circular), substantially similar to the outer shape (e.g., square, rectangular, round, circular) of the tube member 51 having a substantially uniform cross-sectional area, whereby the clearance between the two tube members is minimal, allowing for the larger tube member 52 to be positioned such that a portion of the length of the larger tube member 52 overlaps with a portion of the length of the smaller tube member 51 at the overlapping portion 60. The tube members 51 and 52 may then be coupled through this overlapping portion 60, preferably by laser welding, and preferably by one or more welds 58 that are substantially transverse to the longitudinal axis of the tube members.

Similarly, FIG. 12(b) shows the tube member 51 having a substantially uniform cross-sectional area with an inner shape (e.g., square, rectangular, round, circular), substantially similar to the outer shape (e.g., square, rectangular, round, circular) of the tube member 52 having a substantially uniform cross-sectional area, whereby the clearance between the two tube members is minimal, allowing for the larger tube member 51 to be positioned such that a portion of the length of the larger tube member 51 overlaps with a portion of the length of the smaller tube member 52 at the overlapping portion 60. The tube members 51 and 52 may then be coupled through this overlapping portion 60, preferably by laser welding, and preferably by one or more welds 58 that are substantially transverse to the longitudinal axis of the tube members.

As seen in FIG. 4, the laser welding may be performed using a YAG (yttrium aluminum garnet) laser beam 84, which may be mounted to a programmable robotic arm 86 having a mounted focus optic to provide increased welding access around the joint. According to other embodiments, other methods of laser welding may be used, using various types of beams, having fixed lasers with mirror focus optics or having movable (via programmable robot) mounted focus optics.

FIGS. 12(c) and 12(d) show the coupling of two in-line tube members in which the second tube member 52 having a substantially uniform cross-sectional area is coupled to the first tube member 51 having a varying cross-sectional area at its terminal end. The cross-sectional area of the terminal end of the first tube member 51 may neck (or narrow) down to a smaller cross-sectional area such that it may be coupled the second tube member 52. FIG. 12(c) shows an embodiment in which the inner shape (e.g., square, rectangular, round, circular) of the second tube member 52 may be coupled to the outer shape (e.g., square, rectangular, round, circular) of the terminal end of the first tube member 51. FIG. 12(*d*) shows an embodiment in which the outer shape (e.g., square, rectangular, round, circular) of the second tube member 52 may be coupled to the inner shape (e.g., square, rectangular, round, circular) of the terminal end of the first tube member 51. The coupling of the first and second tube members in FIGS. 12(*c*) and 12(*d*) result in an overlapping portion 60, which is subsequently subjected to laser welding, forming one or more welds 58 that are substantially transverse to the longitudinal axis of the tube members.

FIGS. 12(*e*) and 12(*f*) show the coupling of the two in-line tube members in which the second tube member 52 having a substantially uniform cross-sectional area is coupled to the first tube member 51 having a varying cross-sectional area at its terminal end. The cross-sectional area of the terminal end of the first tube member 51 may expand (or flare) out to a larger cross-sectional area such that it may be coupled to the second tube member. FIG. 12(*e*) shows an embodiment in which the inner shape (e.g., square, rectangular, round, circular) of the second tube member 52 may be coupled to the outer shape (e.g., square, rectangular, round, circular) of the terminal end of the first tube member 51. FIG. 12(*f*) shows an embodiment in which the outer shape (e.g., square, rectangular, round, circular) of the second tube member 52 may be coupled to the inner shape (e.g., square, rectangular, round, circular) of the terminal end of the first tube member 51. The coupling of the first and second tube members in FIGS. 12(*e*) and 12(*f*) result in an overlapping portion 60, which is subsequently subjected to laser welding, forming one or more welds 58 that are substantially transverse to the longitudinal axis of the tube members.

According to other embodiments, the coupling of the two in-line tube members may comprise two tube members in which each has a varying cross-sectional area at its respective terminal end. That is, the cross-sectional area of each tube may neck down or expand out at its respective terminal end, or the cross-sectional area of one tube may neck down at its respective terminal end and the cross-sectional area of the other tube may expand out at its respective terminal end. The first and second terminal ends of each tube member may be the same configuration with respect to each other (both first and second ends are either narrowed, flared, or constant) or the first and second terminal ends of each tube member may be different configurations from each other.

FIG. 12(*g*) shows the coupling of the two in-line tube members in which an additional member or bracket 62 may be used to couple the two in-line tube members having substantially similar cross-sectional areas. The additional member 62 shown is a U-shaped bracket made of a material, such as steel or other suitable material, that may be joined to the two tube members. The additional member 62 may offer strength to the joint. However, other embodiments may include different shaped brackets, such as L-shaped, or may include multiple brackets. The U-shaped bracket of FIG. 12(*g*) has a cross-sectional area that may fit with minimal clearance over the two tube members, which are aligned longitudinally and contacting each other by their respective ends. The U-shaped bracket may then be coupled to each tube, preferably through laser welding but other joining methods may be used, such as by GMAW welding, brazing, gluing, mechanical joining, etc. For example, one or more welds 58 connecting the tube members and the additional member may be made on each side of the additional member along the longitudinal direction of the tube members.

FIGS. 12(*h*)-12(*k*) show the joining of two in-line tube members using different welding configurations at the joints. For example, FIG. 12(*h*) shows two welds 58 that run in a transverse direction, which is perpendicular to the longitudinal direction of the coupled tube members. FIG. 12(*i*) shows two rows of welds 58 that run in the transverse direction of the coupled tube members. FIG. 12(*j*) shows a plurality of welds 58 that run in the longitudinal direction of the coupled tube members. FIG. 12(*k*) shows two welds 58 that run at an angle from the longitudinal direction of the coupled tube members that is different from the transverse direction. The angle may be any suitable angle, such as 25, 30, 45, 60, or 75 degrees from the longitudinal direction. Although FIGS. 12(*h*)-12(*k*) show the possible different directions and continuity of the welds for the coupling shown in FIG. 12(*b*), the types of weld configurations in FIGS. 12(*h*)-12(*k*) may be applicable for all the other interfaces or couplings (for example, FIGS. 12(*a*) and 12(*c*)-12(*f*)). Also, joining of the tube members may be accomplished via different joining processes (for example, GMAW welding, brazing, mechanical locking, gluing, laser welding, any combination thereof, etc.).

FIG. 12(*l*) shows the coupling of two tube members 51 and 52 having substantially similar cross-sectional areas (each of which, in this embodiment, includes a circular outer shape) in which additional members or brackets 62 may be used to couple the tube members. The additional members 62 shown are substantially U-shaped so as to fit around the outer surfaces of the adjoining tube members 51 and 52. The additional members 62 may be made of a material, such as steel or other suitable material, that may be joined to the two tube members. Each U-shaped bracket of FIG. 12(*l*) has a cross-sectional area that may fit with minimal clearance over its respective tube members, which are aligned longitudinally and contacting each other by their respective ends. Each U-shaped bracket may then be coupled to each tube. To join components 51, 52 and 62, one or more of the following may be used: laser welding, any kind of other types of welding, brazing, gluing, or any kind of fasteners using extra parts or parent materials (material of the parts which should be joined), etc. The additional member 62 may offer strength to the joint, may connect the tube members 56*l* and 52, and may include a pivot bracket 64 for attaching a pivoting mechanism for a seat back folding function.

FIGS. 13(*a*)-13(*g*) illustrate different methods of coupling two corner members, which are substantially perpendicular, such as at locations O, P, Q, and R shown in FIG. 11. For the sake of illustration, FIGS. 13(*a*)-13(*g*) shows the coupling methods with regard to the first end 55' of the tube member 55 and the first end 56' of the tube member 56 at the coupling location P, whereby the first end 55' of the tube member 55 may be contacting the first end 56' of the tube member 56, but these methods are just as applicable at the coupling locations O, Q, and R.

FIG. 13(*a*) shows the tube member 55 having a substantially uniform cross-sectional area with an inner shape (e.g., square, rectangular, round, circular), substantially similar to the outer shape (e.g., square, rectangular, round, circular) of the tube member 56 having a substantially uniform cross-sectional area, whereby the clearance between the two tube members is minimal, allowing for the larger tube member 55 to be positioned such that a portion of the length of the larger tube member 55 overlaps with a portion of the length of the smaller tube member 56 at an overlapping portion 60. The inner wall 55*a* of the tube member 55 (indicated in FIG. 13(*g*)) has an opening (such as an aperture with a closed periphery or a notched portion at a terminal end of the tube member) in which the tube member 55 is inserted such that the tube member 56 can be protrude into the interior 55i of the tube member 55. The insertion of the tube member 56 may span the entire width of the tube member 56 so as to be flush with or protrude from the exterior face of the outer wall 55b of the tube member 55 (in this case, the outer face 55b of the tube member 55 has a second opening in which the tube member 56 is inserted), may span the entire transverse distance of the inner shape of the tube member 55 so as to be flush with the interior face of the outer wall 55b (in this case, the outer face 55b of the tube member 55 has no opening in which the tube member 56 is inserted), may span only partially into the interior 55i of the tube member from the opening in the inner wall 55a, or any other suitable distance. The tube members 55 and 56 may then be coupled through the resulting overlapping portion 60, preferably by laser welding, and preferably by one or more welds that may substantially transverse to the longitudinal axis of the tube member 55.

Similarly, FIG. 13(b) shows the tube member 56 having a substantially uniform cross-sectional area with an inner shape (e.g., square, rectangular, round, circular), substantially similar to the outer shape (e.g., square, rectangular, round, circular) of the tube member 55 having a substantially uniform cross-sectional area, whereby the clearance between the two tube members is minimal, allowing for the larger tube member 56 to be positioned such that a portion of the length of the larger tube member 56 overlaps with a portion of the length of the smaller tube member 55 at the overlapping portion 60. The inner wall 56a of the tube member 56 (indicated in FIG. 13(g)) has an opening in which the tube member 55 is inserted such that the tube member 55 can be protrude into the interior 56i of the tube member 56. The insertion of the tube member 55 may span the entire width of the tube member 56 so as to be flush with or protrude from the exterior face of the outer wall 56b of the tube member 56 (in this case, the outer face 56b of the tube member 56 has a second opening in which the tube member 55 is inserted), may span the entire transverse distance of the inner shape of the tube member 56 so as to be flush with the interior face of the outer wall 56b (in this case, the outer face 56b of the tube member 56 has no opening in which the tube member 55 is inserted), may span only partially into the interior 56i of the tube member 56 from the opening in the inner wall 56a, or any other suitable distance. The tube members 55 and 56 may then be coupled through the overlapping portion 60, preferably by laser welding, and preferably by one or more welds that are substantially transverse to the longitudinal axis of the tube member 55.

FIGS. 13(c) and 13(d) show the coupling of two tube members forming a corner section in which the tube member 56 having a substantially uniform cross-sectional area is coupled to the tube member 55 having a varying cross-sectional area at its terminal end. The cross-sectional area of the terminal end of the tube member 55 may neck (or narrow) down to a smaller cross-sectional area such that it may be coupled the tube member 56. FIG. 13(c) shows an embodiment in which the inner shape (e.g., square, rectangular, round, circular) of the terminal end of the tube member 55 may be coupled to the outer shape (e.g., square, rectangular, round, circular) of the tube member 56. The opening(s) and distances in which the tube member 56 can protrude into the interior 55i of the tube member 55 may be those provided above with regard to the embodiment of FIG. 13(a). FIG. 13(d) shows an embodiment in which the outer shape (e.g., square, rectangular, round, circular) of the terminal end of the tube member 55 may be coupled to the inner shape (e.g., square, rectangular, round, circular) of the tube member 56. The opening(s) and distances in which the tube member 55 can protrude into the interior 56i of the tube member 56 may be those provided above with regard to the embodiment of FIG. 13(b). The coupling of the tube members 55 and 56 in FIGS. 13(c) and 13(d) result in an overlapping portion 60, which is subsequently subjected to laser welding, forming one or more welds that may be substantially transverse to the longitudinal axis of the tube member 55.

FIGS. 13(e) and 13(f) show the coupling of the two tube members forming a corner section in which the tube member 56 having a substantially uniform cross-sectional area is coupled to the tube member 55 having a varying cross-sectional area at its terminal end. The cross-sectional area of the terminal end of the tube member 55 may expand (or flare) out to a larger cross-sectional area such that it may be coupled to the tube member 56. FIG. 13(e) shows an embodiment in which the inner shape (e.g., square, rectangular, round, circular) of the terminal end of the tube member 55 may be coupled to the outer shape (e.g., square, rectangular, round, circular) of the tube member 56. The opening(s) and distances in which the tube member 56 can protrude into the interior 55i of the tube member 55 may be those provided above with regard to the embodiment of FIG. 13(a). FIG. 13(f) shows an embodiment in which the outer shape (e.g., square, rectangular, round, circular) of the terminal end of the tube member 55 may be coupled to the inner shape (e.g., square, rectangular, round, circular) of the tube member 56. The opening(s) and distances in which the tube member 55 can protrude into the interior 56i of the tube member 56 may be those provided above with regard to the embodiment of FIG. 13(b). The coupling of the tube members 55 and 56 in FIGS. 13(e) and 13(f) result in an overlapping portion 60, which is subsequently subjected to laser welding, forming one or more welds that are substantially transverse to the longitudinal axis of the tube member 55.

According to other embodiments, the coupling of the two tube members forming a corner section may comprise two tube members in which each has a varying cross-sectional area at its respective terminal end. That is, the cross-sectional area of each tube may neck down or expand out at its respective terminal end, or the cross-sectional area of one tube may neck down at its respective terminal end and the cross-sectional area of the other tube may expand out at its respective terminal end. The first and second terminal ends of each tube member may be the same configuration with respect to each other (both first and second terminal ends are either narrowed, flared, or constant) or the first and second terminal ends of each tube member may be different configurations from each other.

As can be seen from FIGS. 13(a)-13(f), one tube member may overlap another tube member, whereby the clearance is minimal between the inside surfaces of the overlapping tube member and the outside surfaces of the overlapped tube member. The overlapping portions may be coupled, preferably by laser welding, in at least one plane. The laser welding may be performed using a YAG laser beam 84, which may be mounted to a programmable robotic arm 86 having a mounted focus optic to provide increased welding access around the joint. According to other embodiments, other methods of laser welding may be used, using various types of beams, having fixed lasers with mirror focus optics or having movable (via programmable robot) mounted focus optics. One, both or none of the tube members may be constructed having a varying cross-sectional area at its terminal end, whereby each overlapping portion may be necked down or expanded (or flared) out. Additionally, one or both tube members may have an aperture or a notched portion to provide clearance to the other tube.

As with the previous embodiments, the work station 80 may be used to join the tube members 51-56 together in a variety of joining methods other than laser welding. For example, the tube members 51-56 may be joined to each other by brazing, mechanical joining or locking (clamps, etc.), gluing, other types of welding (such as GMAW welding), or any combination thereof.

FIG. 13(*g*) shows the coupling of two tube members forming a corner section in which an additional member or bracket 62 may be used in coupling two substantially perpendicular tubes. The additional member 62 shown is a U-shaped bracket made of a material, such as steel or other suitable material, that may be welded to the two tube members. The additional member 62 may offer strength to the joint. However, other embodiments may include different shaped brackets, such as L-shaped, or may include multiple brackets. The U-shaped bracket of FIG. 13(*g*) has a cross-sectional area that may fit with minimal clearance over the two tube members, which may have substantially similar widths and may contact each other, having the longitudinal axis of one tube member substantially perpendicular to the longitudinal axis of the other tube member. The U-shaped bracket may then be coupled to each tube, preferably through laser welding. For example, one or more welds connecting the tube members and the additional member may be made on each side of the additional member along the longitudinal direction of the tube member 56.

Seat structures such as those disclosed herein, may be coupled in varying planes by coupling a laser emitting apparatus 90 to a controllable, movable robotic arm 86. The robotic arm 86, typically may be programmable to move in the x-axis, y-axis, and z-axis using a controller 88. When the laser welding system is coupled to the robotic arm 86, the manufacturability of the seat structure is improved by increasing the size of the area that may be welded and by being able to weld in multiple planes. The added ability to weld in multiple planes allows for the welding of overlapping closed sections, such as those disclosed herein. Hence the seat structures disclosed herein are constructed such that redundant parts are eliminated and manufacturability is improved so as to provide a mass and cost optimized structure.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples). In addition, any one of the features provided in any one of the embodiments disclosed herein may be incorporated into any one of the other embodiments disclosed herein. For example, the seat structure of FIGS. 10(*a*)-10(*c*) may also include the panel member 48 of FIG. 6 in which the plurality of tubes are also laser welded to the panel member 48.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the seat structures as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A seat structure for installation in a seat assembly, comprising:
 a plurality of tube members forming a substantially closed structure, and
 a panel member joined to the plurality of tube members,
 wherein some of the tube members have a substantially uniform cross-sectional area along a substantial portion of its respective longitudinal length,
 wherein at least a first set of the tube members has at least one of a different dimensional property and a different material property from a second set of the tube members such that mechanical properties of each tube member is configured for stress requirements for a respective region that the respective tube member occupies, and
 wherein the plurality of tube members are joined to the panel member such that the plurality of tube members are in fixed positions relative to each other only through their respective joining to the panel member.

2. The seat structure according to claim 1, wherein the plurality of tube members have substantially rectangular cross-sectional areas with substantially rectangular external perimeters in a transverse direction.

3. The seat structure according to claim 1, wherein the at least one of the different dimensional property and the different material property includes at least one of an exterior width, an exterior height, a transverse cross-sectional area, a material thickness, and a material composition.

4. The seat structure according to claim 1, wherein the plurality of tube members comprises a first tube member having a first cross-sectional area along a substantial portion of its longitudinal length and a second tube member having a second cross-sectional area along a substantial portion of its longitudinal length that is different from the first cross-sectional area.

5. The seat structure according to claim 4, wherein the plurality of tube members comprise a third tube member with a third cross-sectional area along a substantial portion of its longitudinal length that is different from the first and second cross-sectional areas, and a fourth tube member with a fourth cross-sectional area along a substantial portion of its longitudinal length that is different from the first, second, and third cross-sectional areas.

6. The seat structure according to claim 1, wherein the panel member has notched sections, and wherein the plurality of tube members are joined to the notched sections of the panel member such that the plurality of tube members are in fixed positions relative to each other through their respective joining to the notched sections of the panel member.

7. The seat structure according to claim 1, wherein the panel member is joined to each of the plurality of tube members via at least one of welding, mechanical joining, brazing, gluing, and any combination thereof.

8. The seat structure according to claim 6, wherein a first tube member from the first set of the tube members and a second tube member from the second set of the tube members are substantially in line, longitudinally, with each other at a notched section of the panel member.

9. The seat structure according to claim 1, wherein a first tube member from the first set of the tube members and a second tube member from the second set of the tube members are substantially in line, longitudinally, with each other.

10. A method of making a seat structure for installation in a seat assembly, comprising:
    placing a plurality of tube members on a joining fixture, wherein at least a first set of the tube members has at least one of a different dimensional property and a different material property from a second set of the tube members such that mechanical properties of each tube member is configured for stress requirements for a respective region that the respective tube member occupies, and
    joining the plurality of tube members on the joining fixture to a back panel such that a substantially closed structure is formed with the plurality of tube members being fixed relative to each other only through their respective joining to the back panel.

11. The method according to claim 10, wherein the back panel is placed on the joining fixture one of before and after the plurality of tube members are placed on the joining fixture.

12. The method according to claim 11, wherein the joining of the tube members comprises joining the tube members to the back panel by at least one of laser welding, mechanical joining, brazing, gluing, and any combination thereof.

13. The method according to claim 10, wherein the at least one of the different dimensional property and the different material property includes at least one of an exterior width, an exterior height, a transverse cross-sectional area, a material thickness, and a material composition.

14. The method according to claim 10, wherein the back panel has notched sections, and wherein the joining of the plurality of tube members on the joining fixture to the back panel comprises joining the plurality of tube members on the joining fixture to the notched sections of the back panel such that the substantially closed structure is formed with the plurality of tube members being fixed relative to each other through their respective joining to the notched sections of the back panel.

15. The method according to claim 14, wherein a first tube member from the first set of the tube members and a second tube member from the second set of the tube members are substantially in line, longitudinally, with each other at a notched section of the back panel.

16. The method according to claim 10, wherein a first tube member from the first set of the tube members and a second tube member from the second set of the tube members are substantially in line, longitudinally, with each other.

* * * * *

UNITED STATES PATENT AND TRADEMARK OFFICE
CERTIFICATE OF CORRECTION

| | | |
|---|---|---|
| PATENT NO. | : 8,814,273 B2 | Page 1 of 1 |
| APPLICATION NO. | : 13/146615 | |
| DATED | : August 26, 2014 | |
| INVENTOR(S) | : Zekavica et al. | |

It is certified that error appears in the above-identified patent and that said Letters Patent is hereby corrected as shown below:

Title Page, item (*) please delete reference to a Terminal Disclaimer.

Signed and Sealed this
First Day of December, 2015

Michelle K. Lee
*Director of the United States Patent and Trademark Office*